United States Patent
Martinez Corral et al.

(10) Patent No.: US 11,604,343 B2
(45) Date of Patent: Mar. 14, 2023

(54) PLENOPTIC OCULAR DEVICE

(71) Applicants: Universitat de Valencia, Valencia (ES); Universidad Nacional de Colombia, Bogota (CO)

(72) Inventors: Manuel Martinez Corral, Valencia (ES); Genaro Saavedra Tortosa, Valencia (ES); Gabriele Scrofani, Valencia (ES); Angel Tolosa Ruiz, Valencia (ES); Jorge Garcia Sucerquia, Bogota (CO)

(73) Assignee: Universitat De Valencia, Valencia (ES)

( * ) Notice: Subject to any disclaimer, the term of this patent is extended or adjusted under 35 U.S.C. 154(b) by 178 days.

(21) Appl. No.: 17/266,651

(22) PCT Filed: Aug. 8, 2019

(86) PCT No.: PCT/ES2019/070559
§ 371 (c)(1),
(2) Date: Feb. 8, 2021

(87) PCT Pub. No.: WO2020/030841
PCT Pub. Date: Feb. 13, 2020

(65) Prior Publication Data
US 2021/0325658 A1    Oct. 21, 2021

(30) Foreign Application Priority Data
Aug. 8, 2018   (ES) .................................. P201830812

(51) Int. Cl.
*G02B 21/36*   (2006.01)
*G02B 27/00*   (2006.01)

(52) U.S. Cl.
CPC ......... *G02B 21/367* (2013.01); *G02B 21/361* (2013.01); *G02B 27/0075* (2013.01)

(58) Field of Classification Search
CPC . G02B 21/367; G02B 21/361; G02B 27/0075
(Continued)

(56) References Cited

U.S. PATENT DOCUMENTS

| | | | | |
|---|---|---|---|---|
| 2005/0111088 A1* | 5/2005 | Winterot | .............. | G02B 21/361 359/368 |
| 2014/0209821 A1* | 7/2014 | Santori | ................ | G02B 21/365 250/578.1 |

(Continued)

FOREIGN PATENT DOCUMENTS

CN    104849852 B    8/2017

OTHER PUBLICATIONS

Marcus "Lightfield Forum", Homemade Lytro Modifications and Accessories, Jan. 5, 2013 http://lightfield-forum.com/2013/01/homemade-lytro-modifications-and-accessories-diy-ring-light-diy-filter-adapter-and-a-lightfield-microscope/.*

(Continued)

*Primary Examiner* — James T Boylan
(74) *Attorney, Agent, or Firm* — Danielson Legal LLC

(57) ABSTRACT

The invention relates to a plenoptic ocular device intended to be coupled in an ocular port of an optical instrument configured to generate a real image of a sample on a focal plane situated in a region close to said ocular port, said plenoptic ocular device being configured to capture said real image, generate a set of elemental images and send them to recording means with spatial discretisation which in turn comprises communication means configured to transmit the set of elemental images to external image processing means.

6 Claims, 2 Drawing Sheets

(58) Field of Classification Search
USPC .......................................................... 348/79
See application file for complete search history.

(56) References Cited

U.S. PATENT DOCUMENTS

| | | | | |
|---|---|---|---|---|
| 2014/0267674 | A1* | 9/2014 | Mertz | G01J 9/00 |
| | | | | 348/79 |
| 2017/0085832 | A1* | 3/2017 | Drazic | G02B 7/34 |
| 2018/0124379 | A1* | 5/2018 | Lin | H04N 13/204 |
| 2021/0217190 | A1* | 7/2021 | Engel | G06T 11/001 |

OTHER PUBLICATIONS

Raytrix (A Small Revolution: The 3D Light Field Camera), Aug. 10, 2015 https://raytrix.de/wp-content/uploads/software/Raytrix_DeutschesMuseum_Poster.pdf.*

Raytrix website for verifying/displaying the filing date for the NPL document V https://raytrix.de/technology/.*

International preliminary report on patentability for PCT/ES2019/070559, dated Sep. 15, 2020, 16 pages.

Jiang Xiaoli et al., "Hardware implement of high resolution light field microscopy", Proceedings of Spie ISSN 0277-786X vol. 10524, Spie, US, vol. 10458, Oct. 24, 2017, pp. 104581R, XP060097293.

Martinez-Corral M. et al., "Integral imaging with Fourier-plane recording", Proceedings of Spie ISSN 0277-786X vol. 10524, Spie, US, vol. 10219, May 10, 2017, pp. 102190B, XP060089429.

Goko Imaging Devices Co. et al. "USB camera for eyepieces, MVC-D USB eyepiece cameras (multi video camera attachments for viewfinders) Goko imaging devices co., ltd. imaging products", Dec. 31, 2014 XP055652427, https://gokocamera.com/english/mvc/mvc-direct-usb.php [retrieved on Dec. 12, 2019].

Storey Malcolm: "Mycological microscopy part 1: choosing your equipment", Field Mycology, Elsevier, Amsterdam, NL, vol. 17, No. 4, Oct. 20, 2016, pp. 114-123, XP029774789.

Spanish search report for P2018030812, dated Apr. 25, 2019, 1 page.

"Matoba, Osamu, et al. Real-time three-dimensional object recognition with multiple perspectives imaging." Applied Optics, vol. 40, No. 20, Jul. 10, 2011.

Barzi, Fatemeh, et al. "Automatic objects' depth estimation based on integral imaging" Intelligent Data Processing Laboratory (IDPL), Department of Electrical Engineering, Shahid Bahonar University of Kerman, Kerman, Iran. May 25, 2022.

Montes, N. et al. "Numerical technique for the space discretization of resin infusion mould sensing with artificial vision." Universidad CEU Cardenal Herrera. Int J Mater Form Suppl 1:923-926, 2008.

* cited by examiner

PLENOPTIC OCULAR DEVICE

CROSS REFERENCE TO RELATED APPLICATIONS

The present application is a national phase application of International (PCT) Patent Appl. No. PCT/ES2019/070559, filed internationally on Aug. 8, 2019, and claims the benefit of and priority to Spanish Patent Appl. No. P201830812, filed on Aug. 8, 2018, the entire disclosure of each of which is incorporated by reference as if set forth in their entirety herein.

TECHNICAL FIELD OF THE INVENTION

The present invention relates to the field of optical devices and instruments, particularly to accessory devices which can be inserted into the ocular port of said optical instruments and which are provided to improve the quality of the observation of the objects or samples.

PRIOR ART

Instruments have been developed in the field of optics to study elements, materials or celestial bodies to improve the image obtained of those objects and thus determining their characteristic properties.

Particularly, optical microscopy has played a key role in the development of life and material sciences. Thanks to the advances in this sector, it has been possible, for example, to study diseases at a cellular level which has paved the way for the development of medicines and treatments which have saved millions of lives.

Conventionally, optical microscopy has been focused on obtaining 2D images of the samples observed; however, in recent times, microscopes have been implemented that incorporate some kind of technology allowing 3D images of the microscopic samples to be obtained.

Among the options for providing 3D images of said microscopic samples is confocal microscopy, digital holographic microscopy, structured microscopy and integral microscopy, among others. Integral microscopy, also called plenoptic microscopy or light field microscopy has, as the main feature, the capacity to record 3D information of thick samples from the capture of different vertical and horizontal perspectives of the sample being studied. These perspectives are obtained by means of spatial or temporal multiplexing of the field of view of the microscope; from such perspectives, the 3D information of the sample can be calculated using conventional algorithms developed for this purpose. In the more complex version of integral microscopy, the series of vertical and horizontal perspectives of the sample are acquired by means of a microlens array situated in front of a digital sensor, which can be a CCD or CMOS camera.

Another technique used to capture the light field is based on the use of arrays or camera arrangements. Camera is understood as the unit formed by a photographic objective and a digital sensor. This technique is used in applications for macroscopic imaging, wherein the resolving power is not limited by diffraction. However, the use of this technique is not recommended in microscopy because here the diffraction is the main limiting factor of the resolving power, since the size of the aperture diaphragm of the objective is much smaller than that of the actual objective. This means a much worse resolving power than that obtained when lens arrays are employed.

In spite of the development that has been made in the field of integral microscopy, the systems for obtaining 3D images known thus far are essentially voluminous laboratory assemblies, the practical application of which is conditioned to the adaptation of the samples to the conditions that an assembly of this type imposes.

Therefore, options have not been explored which enable a 2D microscope to be easily adapted to obtain plenoptic 3D images.

In the prior art, there are devices couplable in optical microscopes with the aim of improving some functions of the microscope. For example, Chinese utility model CN20134499 discloses an electronic ocular with 30 magnifications for an optical microscope which comprises an ocular tube (1) and extended neck (2) which are connected in an orderly fashion, wherein the front end of said ocular tube (1) is installed with an ocular lens I (3); the rear end of said cylinder of the ocular is installed with an ocular lens II (4); in the internal part of said extended neck (2), an image sensor chip (5) is installed. Preferably, the image sensor (5) is a sensor of the CCD or CMOS type.

The advantages of the ocular device disclosed in this utility model is to achieve a magnification of up to 30 times, 10 only changing the electronic ocular, and 16 magnifications coupling the ocular tube (1) in the tube of the ocular of an optical microscope with a smooth transition; however, this device, despite being a high magnification electronic ocular, corresponds to a conventional ocular in the sense that it does not provide 3D images.

Another disclosure of a device similar to the one indicated above is the Japanese patent application JP2017219590 which discloses a connection adapter (1) which can connect an image sensor to an inspection device which has an optical mechanism. The connection adapter (1) includes a principal adapter body (4), a support (5) to which the image sensor can be coupled and a support (5) within the assembly adapter body (4) in the axial direction which passes through the centre of the optical mechanism of the inspection device and the centre of the image sensor, and an assembly movement mechanism which enables the movable member to move. The assembly movement mechanism is composed of an external cylindrical portion (6), a guide groove (14), an enlarged hole (15) and a bolt (16). The connection adapter (1) disclosed in this Japanese application enables to join an image sensor to an inspection device provided with an optical device, what improves the ease of use; however, it does not provide more than a 2D image, in no case does it provide a set of 3D scenes of the sample observed in the microscope equipped with said device.

The Spanish patent ES 2 622 458 describes an integral microscope which is composed exclusively of a microscope objective, a microlens array situated in the stop aperture of the microscope objective, which coincides with the pupil plane, also called Fourier plane, and a CCD sensor. Through the microlenses, images of a sample are captured from different perspectives. It can be seen from this disclosure that the microscope is "integral", that is to say, the technology referred to is integrated in the microscope, so said optical instrument is already prepared to simultaneously acquire images of the sample from different perspectives and, based on these, generate 3D images of said sample. Therefore, the device for forming images of the referenced Spanish patent cannot be adapted to a conventional microscope to convert it into a plenoptic type microscope.

As can be observed from the disclosure of the prior art, devices have been provided which can be coupled in the ocular port of optical instruments, such as in the ocular port of an optical microscope, but none of these devices is designed to obtain 3D plenoptic images from an optical instrument which captures images of the samples in 2D.

Therefore, there is evidence of the need to provide a device which can be coupled and/or integrated in the ocular port of an optical instrument for subjective observation, such as for example an optical microscope, where said device enables multiple plenoptic images of 3D samples to be obtained, in a single shot or take, from different perspectives.

DESCRIPTION

To overcome the needs or gaps in the prior art, the present invention provides a plenoptic ocular device intended to be coupled in an ocular port of an optical instrument which is configured to generate a real image of a sample on a focal plane situated in a region close to said ocular port. The plenoptic ocular device comprises a tubular element which has a first end and a second end opposite to the first end, a coupling means that can be coupled in the ocular port of the optical instrument arranged in the first end, a diaphragm situated at a distance $S_F$ from a first lens arrangement, said diaphragm and/or said first lens arrangement being situated in relation to the focal plane of the ocular port, the focal plane of the ocular port being the plane where the real image provided by the optical instrument is formed, and the first lens arrangement defining a focal distance $f_F$; a second lens arrangement situated at a distance e from the first lens arrangement and which defines a focal distance $f_E$; and a lens array situated at a distance $S'_F$ from the second lens arrangement, configured to capture the real image coming from the optical instrument, generate a set of elemental images and send them to a recording means with spatial discretisation, where said recording means with spatial discretisation is situated at a distance $f_L$ from the lens array and comprises communication means configured to transmit the set of elemental images coming from the lens array to external image processing means.

In alternative embodiments, the position of the lens array is such that it coincides with a focal image generated by the combined focalisation of the first lens arrangement with the second lens arrangement, such that $$S_F = \frac{f_F(f_E - e)}{f_F + f_E - e} \text{ and}$$

$$S'_F = \frac{f_E(f_F - e)}{f_F + f_E - e}.$$

In preferred embodiments, the position of the lens array is such that it coincides with an image plane generated by the combined focalisation of the first lens arrangement with the second lens arrangement, such that $$S_F = \frac{f_F(f_E - e)}{f_F + f_E - e} \text{ and}$$

$$S'_F = \frac{f_F(f_F - e)}{f_F + f_E - e} + \frac{(f_F f_E)^2}{z(f_F + f_E - e)^2},$$

where z is the distance between the exit pupil of the optical instrument and the diaphragm of the plenoptic ocular.

In other preferred embodiments, the lens array comprises a microlens array defined with a period p which defines a focal distance $f_L$ such that the recording means with spatial discretisation is situated on the focal plane of the lens array defined by said focal distance $f_L$.

In other even more alternative embodiments of the plenoptic ocular device, the first lens arrangement and the second lens arrangement as a whole define a focal distance $f_{oc}$ and wherein the diaphragm, when it is configured as a field stop, comprises a circular aperture with diameter $\phi$, such that $$f_{oc} = \frac{f_F f_E}{f_F + f_E - e} \text{ and}$$

$$\phi = p \frac{f_{oc}}{f_L}.$$

In alternative embodiments of the plenoptic ocular device of the invention, the communication means of the recording medium with spatial discretisation are configured to transmit the image set by wired or wireless connection.

In other embodiments, the optical instrument to which the plenoptic ocular device of the invention can be coupled is selected from an optical microscope, theodolites, binoculars, otoscopes, dermatoscopes and any other optical instrument provided with at least one ocular port.

The invention also envisages an optical instrument provided with, at least, two ocular ports, where in the first of said ocular ports the plenoptic ocular device herein described is coupled and/or integrated and in the second ocular port a CCD camera or similar device for capturing 2D images is coupled and/or integrated, where the optical instrument is configured to record, simultaneously or independently, plenoptic 3D images with the plenoptic ocular device of the invention and 2D images with the CCD camera or similar.

One of the advantages achieved with the described invention is that the device is an independent element of the optical instrument, therefore, it can be inserted into different instruments whenever they have an ocular port.

Another advantage of the invention is that it is intended to be freely coupled in the ocular port of the optical instrument. The ocular port is external and easily accessible, such that the process of removing or inserting the device is the same as any ocular, which does not require the use of tools and takes no more than a few seconds to be coupled or removed. In addition, as it is arranged in the ocular port, the plenoptic ocular device is capable of working simultaneously with the conventional part of the optical instrument, being able to take advantage of all the utilities of the host instrument, such as in a microscope, in which the ease of handling samples, the use of light filters, the use of motorised focusing system or any other opto-mechanical attachment can be utilised.

An additional advantage is that the processing of the elemental images to produce the required 3D information of the sample is carried out with conventional algorithms, easily incorporated in known external processing devices such as computers, tablets, smartphones, etc.; therefore, the optical instrument does not require intervention and the application of the device of the present invention is direct and immediate.

BRIEF DESCRIPTION OF THE FIGURES

The above and other advantages and features will be understood fully from the following detailed description of exemplary embodiments with reference to the attached drawings, which should be considered illustrative and non-limiting, wherein.

DETAILED DESCRIPTION OF AN EXEMPLARY EMBODIMENT

In the following detailed description, numerous specific details are outlined in the form of examples to provide a thorough understanding of the relevant teachings. However, it will be evident to the person skilled in the art that the present teachings can be carried out in practice without such details.

According to a preferred embodiment, the invention discloses a plenoptic ocular device (1) which is provided to be coupled in an ocular port of an optical instrument, where such optical instruments fitted with an ocular port can be selected from an optical microscope, theodolites, binoculars, otoscopes, dermatoscopes and any other optical instrument provided with an ocular port.

Figure 1:
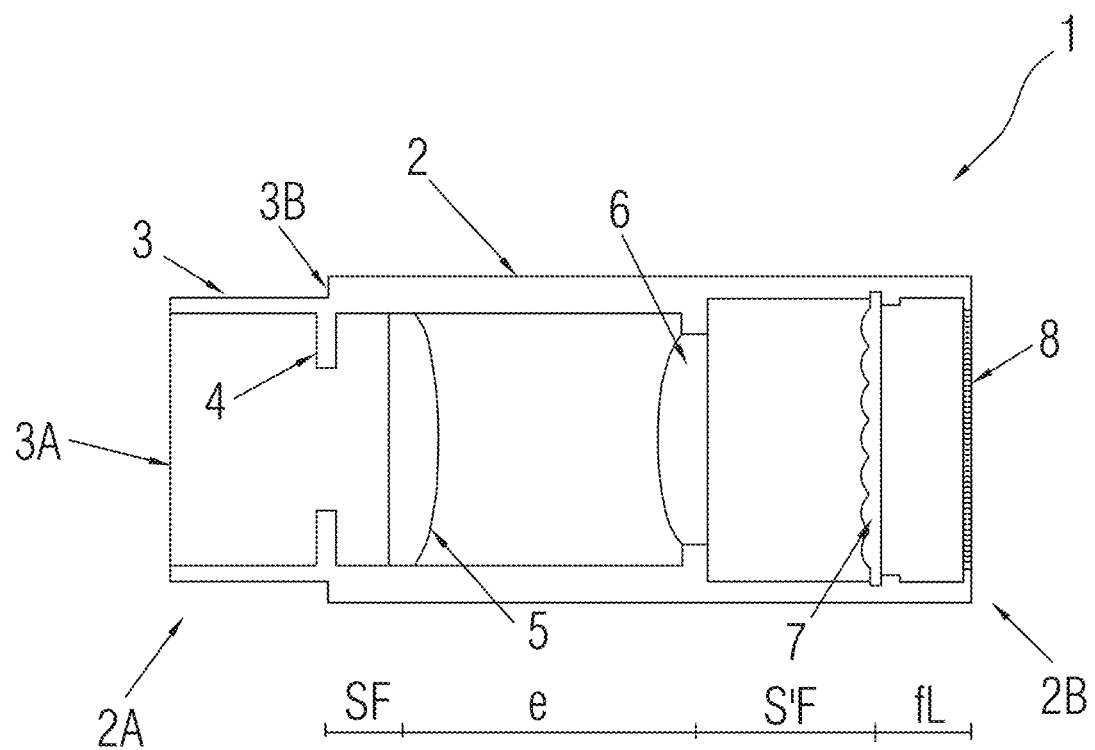
FIG. 1 is a general cross-sectional view of the plenoptic ocular device.

As can be observed in FIG. 1, the plenoptic ocular device (1) comprises a body in the form of a tubular element (2) which is shaped like a support structure configured to secure all the components of the device. The tubular element (2) comprises a first end (2A) which corresponds to the proximal end or preferably oriented towards the ocular port of the optical instrument, and a second end (2B) which corresponds to the distal end or further away from the ocular port, therefore being opposite to the first end (2A). In preferred embodiments, the tubular element (2) is a hollow cylinder, shaped from plastic or metal and/or combinations of these, said tubular element (2) comprising grooves, cavities, stops and/or similar configured to fix the components of the plenoptic ocular device (1).

At the first end (2A) and provided in the tubular element (2), a coupling means (3) to the ocular port is arranged, configured, as its name suggests, to couple the plenoptic ocular device (1) to the ocular port of the optical instrument. In the embodiment shown in FIG. 1, the coupling means (3) is configured as a narrow portion (3A) of the tubular element (2) with a suitable size such that it enables the insertion of said narrow portion (3A) in the ocular port, such that this narrowing of the tubular element (2) generates a shoulder (3B) which acts as an insertion limiter of the coupling means (3) in the ocular port.

As observed in FIG. 1, the plenoptic ocular device (1) comprises a diaphragm (4) whose function is to regulate the quantity of light reaching a first lens arrangement (5), separated a distance from said diaphragm (4). The location of the diaphragm (4) enables it to be configured as a field stop. In preferred embodiments, the diaphragm (4) is an iris type diaphragm, this preferred configuration not being limiting within the scope of the invention.

It is important to clarify that, within the context of the invention, the term, lens arrangement, can refer to a single lens or to the coupling or joining of two or more lens aligned on the same optical axis where each lens arrangement has its particular optical properties, for example the focal points, or focus, the focal length, etc.

In addition, the first lens arrangement (5) is situated at a distance $S_F$ from the diaphragm (4), defining a focal distance $f_F$, being configured as a field lens arrangement such that the visual field is magnified in said first lens arrangement (5). In simplified embodiments, the first lens arrangement (5) comprises a single lens with a plano-convex shape, where the orientation of the convex part of the lens will depend on the position of said lens with respect to the diaphragm (4). In other embodiments, the first lens arrangement (5) is a combination of two or more convex lens superimposed or joined together. As is known in conventional oculars, this first lens arrangement (5) can be situated in a position after the diaphragm (4), that is to say, in a position in which the diaphragm (4) is situated first in relation to the end (2A) and then the first lens arrangement (5), or it can be situated in a position before the diaphragm (4), first with respect to the end (2A). In the first of these cases, as indicated in FIG. 1, the plenoptic ocular device (1) is configured as a "positive" type, where the convex part is oriented towards the end (2B), while in the second case (not illustrated), the ocular device is configured as a negative type, where the convex part of the lens arrangement is oriented towards the end (2A).

In addition, and as can also be seen in FIG. 1, the plenoptic ocular device (1) comprises a second lens arrangement (6) which is situated at a distance e from the first lens arrangement (5) and defines a focal distance $f_E$. This second lens arrangement (6), in its simplest embodiment, comprises a single lens in a plano-convex shape where the convex part of the lens is oriented towards the ocular port. In other embodiments, the second lens arrangement (6) is a combination of two or more convex lens superimposed or joined together.

The elements which have been described thus far form part or will shape a conventional ocular device as is commonly known. In this way, the first lens arrangement (5) would be called the field lens and the second lens arrangement (6) would be the eye lens.

It must be pointed out that the plenoptic ocular device (1) of the invention, like a conventional ocular, is provided to capture a real (intermediate) image of a sample that the optical instrument generates on a focal plane situated in a region close to said ocular port. This "region close to" or in proximity to the ocular port where the focal plane is generated is associated with the type of optical instrument, since, for example, in the case of a telescope, the focal plane is in the image focus of the objective of the telescope, and in the case of a microscope with tubular lens, the focal plane is in the image focus of the tubular lens. For this reason, the ocular device should be situated in a region which is close to the focal plane on which the real (intermediate) image is formed to capture said real image and process it with the elements described below.

As can be seen in FIG. 1, the invention comprises a lens array (7) coupled to the tubular element (2), situated at a distance $S'_F$ from the second lens arrangement (6), where the position of said lens array (7) is such that it coincides with an image focus generated by the combined focalisation of the first lens arrangement (5) with the second lens arrangement (6). The lens array (7) defines a focal distance $f_L$ and is configured to capture the real (magnified) image coming from the optical instrument, in particular, the image provided by the combination of the first lens arrangement (5) and the second lens arrangement (6), generating a set of elemental images and sending them to a recording means with spatial discretisation (8).

In preferred embodiments, the lens array (7) comprises a lens array arranged on the same plane such that the optical axes of each one of the lenses are all parallel to one another and perpendicular to the plane of the lenses. The lenses of the array are defined with a size or a period p and a focal distance $f_L$. It is important to point out that when the lens array (7) is a microlens array, each one of the microlens has a focal distance $f_L$ such that all the focal distances form a common focal plane which is situated at a focal distance also called $f_L$. In this focal plane, the recording means with spatial discretisation (8) is preferably situated.

The recording and spatial discretisation means (8) is preferably situated at the second end (2B) of the body (2) such that it coincides with the focal plane of the lens array (7), as has been previously mentioned, and is configured to record a set of perspective images which, in the previous paragraphs, were called elemental images, which come from the lens array (7) and to transmit said set of images towards external image processing means by means of communication means comprised of said recording and spatial discretisation means (8).

In preferred embodiments, the recording and spatial discretisation means (8) is selected from a CMOS sensor or CCD sensor and/or any other recording means with spatial discretisation capable of recording the set of perspective images coming from the lens array (7). The diaphragm (4) is, in turn, situated in such a manner and has a size such that it operates as a field stop, which guarantees the optimal use of a sensory area of the recording and spatial discretisation means (8).

The communication means provided in the recording and spatial discretisation means (8) can send the recorded images to the external image processing means by way of wired connections of a USB, camera link or other type or by means of wireless links such as WiFi, ZigBee IEEE 802.15.4, Bluetooth or any other type. Such image processing means can be a computer, a tablet or a smartphone.

It is important to point out that to achieve the maximum use of the plenoptic ocular device (1) of the invention both in terms of resolution and visual field, mathematical expressions have been established which enable the diameter of the aperture of the diaphragm (4) to be established when said diaphragm (4) is configured as a field stop, such that the conjugate of the diameter ϕ through the subsequent lens arrangements, that is to say, through the first lens arrangement (5) and the second lens arrangement (6) has the size of the lens array (7).

Taking into account that, as defined in previous paragraphs, e is the distance between the first lens arrangement (5) and the second lens arrangement (6), $f_F$ the focal distance of the first lens arrangement (5) and $f_E$ the focal distance of the second lens arrangement (6), a focal distance $f_{oc}$ of the ocular device as a whole can be calculated using the classic equations of geometric optics:

$$f_{oc} = \frac{f_F f_E}{f_F + f_E - e} \quad (1)$$

It is also possible to calculate the position of the object focal plane $S_F$, that is to say, the distance between the first lens arrangement (5) and the diaphragm (4)

$$S_F = \frac{f_F(f_E - e)}{f_F + f_E - e} \quad (2)$$

and the position of the image focal plane $S'_F$, that is to say, the distance between the second lens arrangement (6) and the lens array (7)

$$S'_F = \frac{f_E(f_F - e)}{f_F + f_E - e} + \frac{(f_F f_E)^2}{z(f_F + f_E - e)^2} \quad (3)$$

where z is the distance from the exit pupil of the optical instrument to the ocular diaphragm.

That said, the diameter ϕ of the aperture of the diaphragm (4), when it is configured as a field stop, and which achieves the maximum performance of the device, is defined by:

$$\phi = p \frac{f_{oc}}{f_L} \quad (4)$$

It is important to note that when referring to diameter ϕ, this refers to the effective diameter since the aperture of the diaphragm can be circular, square, rectangular, hexagonal or polygonal in general, provided that there can be an effective diameter ϕ.

According to the above, the parameters $f_{oc}$, $f_L$ and p are selected to provide a magnification such that the plenoptic ocular device (1) produces the number of elemental images required according to the desired features: the higher the number of elemental images, the greater the depth of field and lower resolution (and vice versa). One situation that optimises the resolution and the depth of field is when the lens array (7) provides a maximum of between 3 and 5 images.

In the embodiments shown, the lens array (7) is bidimensional, being able to have for example 5×5 lenses. In such a case, 5×5 elemental images would be provided or, in other words, 5 elemental images along a Cartesian direction.

Figure 2:
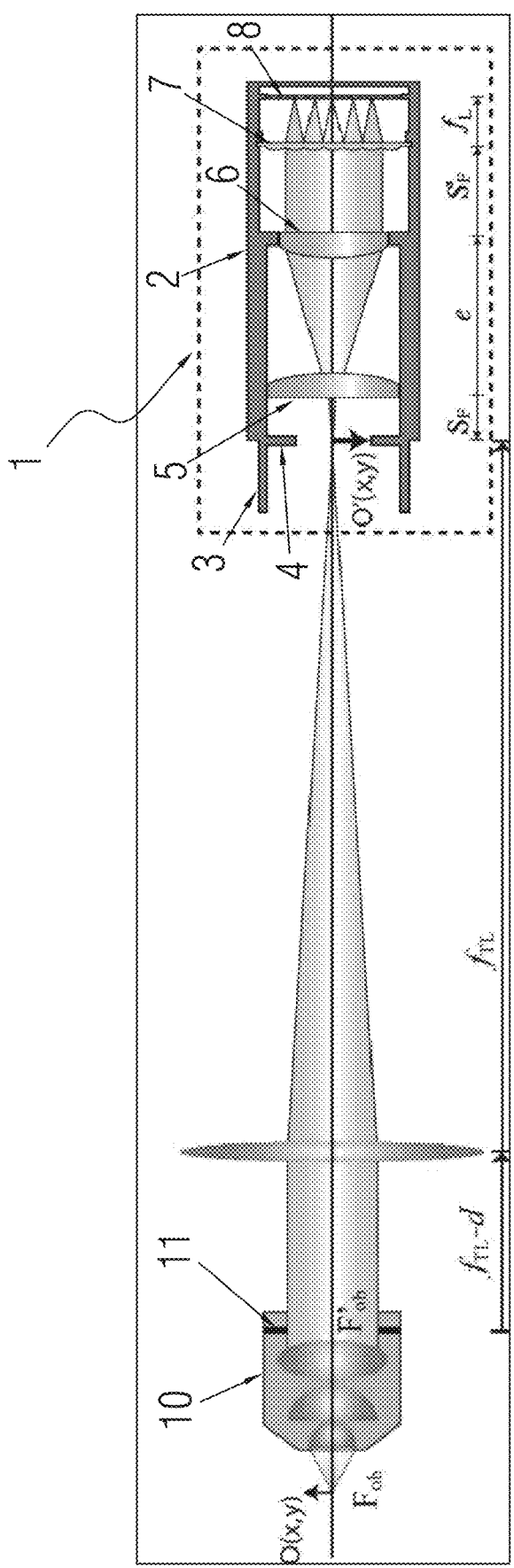
FIG. 2 shows an exemplary coupling between a microscope and the plenoptic ocular device of the invention, wherein, the trajectory followed by the light rays through the microscope from the sample to the plenoptic ocular device is shown schematically.

In FIG. 2, a diagram of an exemplary coupling of the plenoptic ocular device (1) in the ocular port of a microscope is shown which acts on an object O(x, y), where the image is captured by an objective (10) of said instrument, where said objective has at least one set of lenses to focus and produce the real image O'(x, y) of the object O(x, y) observed and an aperture diaphragm (11) to regulate the quantity of light. The real image provided by the optical instrument, O'(x, y), is formed on the diaphragm plane (4) of the plenoptic ocular device (1). As observed in the cited figure, the first lens arrangement (5) and the second lens arrangement (6) provide an image of the object O(x, y) in the infinite and an image of the aperture stop at a distance $S'_F$ from the second lens arrangement (6).

The invention also provides an optical instrument equipped with at least two ocular ports, where in the first of said ocular ports the plenoptic ocular device (1) described here thus far is coupled and/or integrated and in the second ocular port a CCD camera or similar to capture 2D images is coupled and/or integrated, where the optical instrument is configured to record, simultaneously or independently, plenoptic 3D images with the plenoptic ocular device (1) and 2D images with the CCD camera or similar. In this way, an optical instrument is provided capable of providing 2D images and 3D plenoptic images of the sample at the same time or separately.

It must be considered that parts of the invention, especially those corresponding to the processing of the images arriving to the recording and spatial discretisation mean (8)

can be implemented in hardware, software, firmware or a combination of these; and can be implement multiple steps or methods in software or firmware stored in a memory and executed by an instruction execution system suited for such purpose.

The invention claimed is:

1. A plenoptic ocular device (1) provided to be coupled in an ocular port of an optical instrument, the plenoptic ocular device (1) being characterised in that it comprises:
   a tubular element (2) which has a first end (2A) and a second end (2B) opposed to the first end (2A);
   a coupling means (3) arranged at the first end (2A) and configured to couple the plenoptic ocular device to the ocular port of the optical instrument;
   a diaphragm (4) configured to be situated at a plane where a real image provided by the optical instrument is formed;
   a first lens arrangement (5), which defines a focal distance $f_F$; situated at a distance $S_F$ from said diaphragm (4);
   a second lens arrangement (6) situated at a distance e from the first lens arrangement (5) and which defines a focal distance $f_E$; and
   a lens array (7) situated at a distance $S'_F$ from the second lens arrangement (6), and configured to capture the real image coming from the optical instrument and generate a set of perspective images, and
   a recording means with spatial discretisation (8); where said recording means with spatial discretisation (8) is situated at a distance $f_L$ from the lens array (7) for receiving the perspective images generated by the lens array (7), the lens array (7) comprising a microlens array defined with a period p and which defines the focal distance $f_L$;
   the recording means comprising communication means configured to transmit the set of perspective images coming from the lens array (7) to external image processing means;
   wherein the position of the lens array (7) is such that it coincides with an image focus generated by the combined focalisation of the first lens arrangement (5) with the second lens arrangement (6) such that $$S_F = \frac{f_F(f_E - e)}{f_F + f_E - e}; \text{ and } S'_F = \frac{f_E(f_F - e)}{f_F + f_E - e}.$$

2. The plenoptic ocular device (1) according to claim 1, wherein the position of the lens array (7) is such that it coincides with an image plane generated by the combined focalisation of the first lens arrangement (5) with the second lens arrangement (6) such that $$S_F = \frac{f_F(f_E - e)}{f_F + f_E - e}; \text{ and } S'_F = \frac{f_E(f_F - e)}{f_F + f_E - e} + \frac{(f_F f_E)^2}{z(f_F + f_E - e)^2}$$

z being the distance from the exit pupil of the optical instrument to the plane where the diaphragm of the plenoptic ocular device is situated.

3. The plenoptic ocular device (1) of claim 1, wherein the ocular device formed by the first lens arrangement (5) and the second lens arrangement (6) as a whole defines a focal distance $f_{oc}$ and wherein the diaphragm (4), when it is configured as a field stop, comprises a circular, square or hexagonal aperture with an effective diameter $\phi$, such that $$f_{oc} = \frac{f_F f_E}{f_F + f_E - e} \text{ and } \phi = p\frac{f_{oc}}{f_L}.$$

4. The plenoptic ocular device (1) of claim 1, wherein the communication means of the recording means with spatial discretisation (8) are configured to transmit the set of perspective images by means of wired or wireless connection.

5. The plenoptic ocular device (1) of claim 1 wherein the optical instrument is selected from an optical microscope, theodolites, binoculars, otoscopes, dermatoscopes and any other optical instrument provided with at least one ocular port.

6. An optical instrument comprising at least two ocular ports, wherein in the first of said ocular ports the plenoptic ocular device (1) of claim 1 is coupled and/or integrated and in the second ocular port a CCD camera, or any other recording means with spatial discretisation, is coupled and/or integrated, where the optical instrument is configured to record, simultaneously or independently, plenoptic 3D images with the plenoptic ocular device (1) and 2D images with the CCD camera or any other recording means with spatial discretisation.

* * * * *